United States Patent
Ambrosio et al.

(10) Patent No.: US 8,725,551 B2
(45) Date of Patent: May 13, 2014

(54) SMART ELECTRIC VEHICLE INTERFACE FOR MANAGING POST-CHARGE INFORMATION EXCHANGE AND ANALYSIS

(75) Inventors: Ronald Ambrosio, Poughquag, NY (US); Allan James Schurr, Castle Rock, CO (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 12/194,341

(22) Filed: Aug. 19, 2008

(65) Prior Publication Data

US 2010/0049610 A1   Feb. 25, 2010

(51) Int. Cl.
*G06Q 30/00* (2012.01)

(52) U.S. Cl.
USPC ........................................................ 705/7.31

(58) Field of Classification Search
USPC ............................................................ 705/7
See application file for complete search history.

(56) References Cited

U.S. PATENT DOCUMENTS

| | | | |
|---|---|---|---|
| 3,867,682 A | 2/1975 | Yamauchi et al. | |
| 4,306,156 A | 12/1981 | Monaco et al. | |
| 4,351,405 A | 9/1982 | Fields et al. | |
| 4,389,608 A * | 6/1983 | Dahl et al. | 320/137 |
| 4,433,278 A * | 2/1984 | Lowndes et al. | 320/116 |
| 4,532,418 A | 7/1985 | Meese et al. | |
| 5,049,802 A | 9/1991 | Mintus et al. | |
| 5,184,058 A | 2/1993 | Hesse et al. | |
| 5,343,970 A | 9/1994 | Severinsky | |
| 5,359,228 A | 10/1994 | Yoshida | |
| 5,422,624 A | 6/1995 | Smith | |
| 5,441,122 A | 8/1995 | Yoshida | |
| 5,487,002 A | 1/1996 | Diller et al. | |
| 5,492,189 A | 2/1996 | Kriegler et al. | |
| 5,492,190 A | 2/1996 | Yoshida | |
| 5,548,200 A | 8/1996 | Nor et al. | |
| 5,563,491 A | 10/1996 | Tseng | |
| 5,566,774 A | 10/1996 | Yoshida | |
| 5,594,318 A | 1/1997 | Nor et al. | |

(Continued)

FOREIGN PATENT DOCUMENTS

| | | |
|---|---|---|
| AU | 2003208173 | 9/2003 |
| JP | 2000279519 | 10/2000 |

(Continued)

OTHER PUBLICATIONS

USPTO office action for U.S. Appl. No. 12/194,290 dated Jun. 4, 2010.

(Continued)

*Primary Examiner* — Leland Marcus
(74) *Attorney, Agent, or Firm* — Yee & Associates, P.C.; David Mims

(57) ABSTRACT

A computer implemented method, apparatus, and computer program product for managing post-charge information distribution for an electric vehicle. In one embodiment, a user profile is updated with charging process data that is derived, in part, from a charging process between the electric vehicle and a charging station. The process then identifies a set of recipients of data from the user profile. The set of recipients include a set of third party principals. The data from the user profile is processed using a set of data processing rules specified by the set of recipients to form processed data. Thereafter, the processed data is transmitted to the set of recipients according to preferences of the set of recipients.

20 Claims, 5 Drawing Sheets

(56) References Cited

U.S. PATENT DOCUMENTS

| | | | |
|---|---|---|---|
| 5,627,752 A | 5/1997 | Buck et al. | |
| 5,642,270 A | 6/1997 | Green et al. | |
| 5,675,205 A | 10/1997 | Jacob et al. | |
| 5,736,833 A | 4/1998 | Farris | |
| 5,778,326 A | 7/1998 | Moroto et al. | |
| 6,067,008 A | 5/2000 | Smith | |
| 6,081,205 A | 6/2000 | Williams | |
| 6,225,776 B1 | 5/2001 | Chai | |
| 6,234,932 B1 | 5/2001 | Kuroda et al. | |
| 6,252,380 B1 * | 6/2001 | Koenck | 320/150 |
| 6,278,915 B1 | 8/2001 | Deguchi et al. | |
| 6,285,931 B1 | 9/2001 | Hattori et al. | |
| 6,301,531 B1 * | 10/2001 | Pierro et al. | 701/29 |
| 6,307,349 B1 * | 10/2001 | Koenck et al. | 320/112 |
| 6,373,380 B1 | 4/2002 | Robertson et al. | |
| 6,434,465 B2 | 8/2002 | Schmitt et al. | |
| 6,456,041 B1 * | 9/2002 | Terada et al. | 320/132 |
| 6,466,658 B2 | 10/2002 | Schelberg, Jr. et al. | |
| 6,480,767 B2 | 11/2002 | Yamaguchi et al. | |
| 6,487,477 B1 | 11/2002 | Woestman et al. | |
| 6,586,866 B1 | 7/2003 | Ikedo et al. | |
| 6,609,582 B1 | 8/2003 | Botti et al. | |
| 6,614,204 B2 | 9/2003 | Pellegrino et al. | |
| 6,629,024 B2 | 9/2003 | Tabata et al. | |
| 6,727,809 B1 | 4/2004 | Smith | |
| 6,741,036 B1 | 5/2004 | Ikedo et al. | |
| 6,766,949 B2 | 7/2004 | Terranova et al. | |
| 6,789,733 B2 | 9/2004 | Terranova et al. | |
| 6,794,849 B2 | 9/2004 | Mori et al. | |
| 6,850,898 B1 | 2/2005 | Murakami et al. | |
| 6,909,200 B2 | 6/2005 | Bouchon | |
| 6,915,869 B2 | 7/2005 | Botti et al. | |
| 7,013,205 B1 | 3/2006 | Hafner et al. | |
| 7,027,890 B2 | 4/2006 | Wilson | |
| 7,039,389 B2 | 5/2006 | Johnson, Jr. | |
| 7,049,720 B2 | 5/2006 | Darday | |
| 7,178,616 B2 | 2/2007 | Botti et al. | |
| 7,216,729 B2 | 5/2007 | Syed et al. | |
| 7,243,010 B2 | 7/2007 | Tabata et al. | |
| 7,309,966 B2 | 12/2007 | Wobben | |
| 7,402,978 B2 | 7/2008 | Pryor | |
| 7,565,396 B2 | 7/2009 | Hoshina | |
| 7,674,536 B2 | 3/2010 | Chipchase et al. | |
| 7,693,609 B2 | 4/2010 | Kressner et al. | |
| 7,698,078 B2 | 4/2010 | Kelty et al. | |
| 7,740,092 B2 | 6/2010 | Bender | |
| 7,885,893 B2 | 2/2011 | Alexander | |
| 7,949,435 B2 | 5/2011 | Pollack et al. | |
| 7,956,570 B2 | 6/2011 | Lowenthal et al. | |
| 7,991,665 B2 | 8/2011 | Hafner et al. | |
| 8,054,048 B2 | 11/2011 | Woody et al. | |
| 8,103,386 B2 | 1/2012 | Ichikawa et al. | |
| 8,103,391 B2 | 1/2012 | Ferro et al. | |
| 2002/0064258 A1 | 5/2002 | Schelberg, Jr. et al. | |
| 2002/0153726 A1 | 10/2002 | Sumner | |
| 2003/0137277 A1 | 7/2003 | Mori et al. | |
| 2003/0153278 A1 | 8/2003 | Johnson, Jr. | |
| 2003/0205619 A1 | 11/2003 | Terranova et al. | |
| 2004/0046506 A1 | 3/2004 | Kawai et al. | |
| 2004/0062059 A1 | 4/2004 | Cheng et al. | |
| 2004/0265671 A1 | 12/2004 | Chipchase et al. | |
| 2005/0008904 A1 | 1/2005 | Suppes | |
| 2005/0044245 A1 | 2/2005 | Hoshina | |
| 2005/0231119 A1 | 10/2005 | Ito et al. | |
| 2006/0182241 A1 | 8/2006 | Schelberg, Jr. et al. | |
| 2006/0282381 A1 | 12/2006 | Ritchie | |
| 2006/0287783 A1 | 12/2006 | Walker | |
| 2007/0126395 A1 | 6/2007 | Suchar | |
| 2007/0282495 A1 | 12/2007 | Kempton et al. | |
| 2008/0039979 A1 | 2/2008 | Bridges et al. | |
| 2008/0039989 A1 | 2/2008 | Pollack et al. | |
| 2008/0040223 A1 | 2/2008 | Bridges et al. | |
| 2008/0040295 A1 | 2/2008 | Kaplan et al. | |
| 2008/0052145 A1 | 2/2008 | Kaplan et al. | |
| 2008/0086411 A1 | 4/2008 | Olson et al. | |
| 2008/0097904 A1 | 4/2008 | Volchek et al. | |
| 2008/0155008 A1 | 6/2008 | Stiles et al. | |
| 2008/0180027 A1 | 7/2008 | Matsushita et al. | |
| 2008/0228613 A1 | 9/2008 | Alexander | |
| 2008/0281663 A1 * | 11/2008 | Hakim et al. | 705/8 |
| 2008/0312782 A1 | 12/2008 | Berdichevsky et al. | |
| 2009/0021213 A1 | 1/2009 | Johnson | |
| 2009/0030712 A1 | 1/2009 | Bogolea et al. | |
| 2009/0043519 A1 | 2/2009 | Bridges et al. | |
| 2009/0066287 A1 | 3/2009 | Pollack et al. | |
| 2009/0076913 A1 | 3/2009 | Morgan | |
| 2009/0082957 A1 | 3/2009 | Agassi et al. | |
| 2009/0091291 A1 | 4/2009 | Woody et al. | |
| 2009/0092864 A1 | 4/2009 | McLean et al. | |
| 2009/0144001 A1 * | 6/2009 | Leonard et al. | 702/63 |
| 2009/0174365 A1 | 7/2009 | Lowenthal et al. | |
| 2009/0177580 A1 | 7/2009 | Lowenthal et al. | |
| 2009/0210357 A1 | 8/2009 | Pudar et al. | |
| 2009/0287578 A1 | 11/2009 | Paluszek et al. | |
| 2009/0312903 A1 | 12/2009 | Hafner et al. | |
| 2009/0313032 A1 | 12/2009 | Hafner et al. | |
| 2009/0313033 A1 | 12/2009 | Hafner et al. | |
| 2009/0313034 A1 | 12/2009 | Ferro et al. | |
| 2009/0313098 A1 | 12/2009 | Hafner et al. | |
| 2009/0313103 A1 | 12/2009 | Ambrosio et al. | |
| 2009/0313104 A1 | 12/2009 | Hafner et al. | |
| 2009/0313174 A1 | 12/2009 | Hafner et al. | |
| 2010/0017045 A1 | 1/2010 | Nesler et al. | |
| 2010/0049396 A1 | 2/2010 | Ferro et al. | |
| 2010/0049533 A1 | 2/2010 | Ferro et al. | |
| 2010/0049639 A1 | 2/2010 | Ferro et al. | |
| 2010/0049737 A1 | 2/2010 | Ambrosio et al. | |
| 2010/0169008 A1 | 7/2010 | Niwa et al. | |

FOREIGN PATENT DOCUMENTS

| | | | |
|---|---|---|---|
| JP | 2000289355 | | 10/2000 |
| JP | 2001359203 A | * | 12/2001 |
| JP | 2006262570 A | | 9/2006 |
| WO | WO03075440 | | 9/2003 |
| WO | WO2006057889 | | 6/2006 |

OTHER PUBLICATIONS

U.S. Appl. No. 12/139,562, filed Jun. 16, 2008, Hafner et al.
U.S. Appl. No. 12/139,564, filed Jun. 16, 2008, Hafner et al.
U.S. Appl. No. 12/139,565, filed Jun. 16, 2008, Hafner et al.
U.S. Appl. No. 12/139,569, filed Jun. 16, 2008, Ferro et al.
U.S. Appl. No. 12/139,571, filed Jun. 16, 2008, Hafner et al.
U.S. Appl. No. 12/194,245, filed Aug. 19, 2008, Ferro et al.
U.S. Appl. No. 12/194,325, filed Aug. 19, 2008, Ferro et al.
U.S. Appl. No. 12/139,561, filed Jun. 16, 2008, Hafner et al.
U.S. Appl. No. 12/194,210, filed Aug. 19, 2008, Ambrosio et al.
U.S. Appl. No. 12/194,290, filed Aug. 19, 2008, Ferro et al.
U.S. Appl. No. 12/139,574, filed Jun. 16, 2008, Ambrosio et al.
U.S. Appl. No. 12/139,575, filed Jun. 16, 2008, Hafner et al.
USPTO office action for U.S. Appl. No. 12/139,575 dated Oct. 8, 2010.
USPTO office action for U.S. Appl. No. 12/194,210 dated Nov. 22, 2010.
USPTO office action for U.S. Appl. No. 12/139,569 dated Apr. 25, 2011.
USPTO office action for U.S. Appl. No. 12/139,565 dated Jun. 1, 2011.
USPTO office action for U.S. Appl. No. 12/139,571 dated Apr. 25, 2011.
Brooks, "State Unveils Plan to Help Drivers Recharge Their Electric Vehicles", Los Angeles Times, Los Angeles CA, Aug. 29, 1998, D1.
Wildman, "Gas-Free Nation", New York Times Magazine, New York, Apr. 20, 2008, p. 69.
USPTO final office action for U.S. Appl. No. 12/194,210 dated Mar. 25, 2011.
USPTO notice of allowance for U.S. Appl. No. 12/139,575 dated Mar. 8, 2011.
Hafner et al., U.S. Appl. No. 13/430,864, filed Mar. 27, 2012, 55 pages.

(56) References Cited

OTHER PUBLICATIONS

Ambrosio et al., U.S. Appl. No. 13/431,539, filed Mar. 27, 2012, 66 pages.
Office Action, dated Mar. 1, 2012, regarding U.S. Appl. No. 12/139,562, 8 pages.
Notice of Allowance, dated Apr. 30, 2012, regarding U.S. Appl. No. 12/139,574, 17 pages.
Final Office Action, dated May 11, 2012, regarding U.S. Appl. No. 12/194,245, 32 pages.
USPTO Office Action dated Oct. 6, 2010, regarding U.S. Appl. No. 12/139,561, 10 pages.
USPTO Office Action dated Jan. 7, 2011, regarding U.S. Appl. No. 12/139,561, 9 pages.
USPTO Office Action dated Jul. 11, 20110, regarding U.S. Appl. No. 12/139,561, 15 pages.
USPTO Office Action dated Feb. 2, 2012, regarding U.S. Appl. No. 12/139,561, 12 pages.
USPTO Office Action dated Oct. 3, 2011, regarding U.S. Appl. No. 12/139,562, 65 pages.
USPTO Final Office Action dated Feb. 7, 2012, regarding U.S. Appl. No. 12/139,562, 47 pages.
USPTO Office Action dated Jan. 5, 2012, regarding U.S. Appl. No. 12/139,564, 26 pages.
USPTO Final Office Action dated Oct. 26, 2011, regarding U.S. Appl. No. 12/139,565, 27 pages.
USPTO Final Office Action dated Oct. 19, 2011, regarding U.S. Appl. No. 12/139,569, 35 pages.
USPTO Final Office Action dated Oct. 14, 2011, regarding U.S. Appl. No. 12/139,571, 36 pages.
USPTO Notice of Allowance dated Jan. 19, 2012, regarding U.S. Appl. No. 12/139,574, 38 pages.
Appeal Brief dated Aug. 24, 2011, regarding U.S. Appl. No. 12/194,210, 35 pages.
USPTO Examiner's Answer dated Nov. 2, 2011, regarding U.S. Appl. No. 12/194,210, 21 pages.
Reply Brief dated Dec. 21, 2011, regarding U.S. Appl. No. 12/194,210, 15 pages.
USPTO Office Action dated Nov. 18, 2011, regarding U.S. Appl. No. 12/194,245, 40 pages.
USPTO Final Office Action dated Nov. 29, 2010, regarding U.S. Appl. No. 12/194,290, 10 pages.
Appeal Brief dated May 2, 2011, regarding U.S. Appl. No. 12/194,290, 57 pages.
USPTO Examiner's Answer dated Jul. 6, 2011, regarding U.S. Appl. No. 12/194,290, 24 pages.
Reply Brief dated Sep. 6, 2011, regarding U.S. Appl. No. 12/194,290, 9 pages.
USPTO Office Action dated Jun. 20, 2011, regarding U.S. Appl. No. 12/194,325, 25 pages.
USPTO Notice of Allowance dated Sep. 14, 2011, regarding U.S. Appl. No. 12/194,325, 7 pages.
Non-final office action dated May 26, 2010 regarding U.S. Appl. No. 12/048,183, 14 pages.
Notice of allowance dated Dec. 10, 2010 regarding U.S. Appl. No. 12/048,183, 10 pages.
Non-final office action dated Aug. 16, 2005 regarding U.S. Appl. No. 10/992,840, 9 pages.
Notice of allowance dated Dec. 1, 2005 regarding U.S. Appl. No. 10/992,840, 8 pages.
International search report dated Jan. 3, 2007 regarding application PCT/US2005/041688, 1 page.

Boujelelben et al., "Evaluation and optimization of a hybrid urban Microbus," IEEE Conference on Electric and Hybrid Vehicles, Dec. 2006, pp. 1-8.
Cikanek et al., "Control System and Dynamic Model Validation for a Parallel Hybrid Electric Vehicle," Proceedings of the 1999 American Control Conference, vol. 2, Jun. 1999, pp. 1222-1227.
De Breucker et al., "Grid Power Quality Improvements Using Grid-Coupled Hybrid Electric Vehicles PEMD 2006," The 3rd IET International Conference on Power Electronics, Machines and Drives, Mar. 2006, pp. 505-509.
Gonder et al., "Energy Management Strategies for Plug-In Hybrid Electric Vehicles," 2007 SAE World Congress, Apr. 2007, 13 pages.
Markel et al., "Plug-in Hybrid Electric Vehicle Energy Storage System Design," Advanced Automotive Battery Conference, May 2006, 13 pages.
O'Keefe et al., "Dynamic Programming Applied to Investigate Energy Management Strategies for a Plug-in HEV," 22nd International Battery, Hybrid and Fuel Cell Electric Vehicle Symposium and Exhibit, Oct. 2006, 15 pages.
Piccolo et al., "Fuzzy Logic Based Optimal Power Flow Management in Parallel Hybrid Electric Vehicles," Iranian Journal of Electrical and Computer Engineering, vol. 4, No. 2, Summer-Fall 2005, pp. 83-93.
Short et al., "A Preliminary Assessment of Plug-In Hybrid Electric Vehicles on Wind Energy Markets," Technical Report NREL/TP-620-39729, National Renewable Energy Laboratory, Apr. 2006, 41 pages.
Zhonghao et al., "Research on Modeling and Simulation of Hybrid Electric Vehicle Energy Control Systems," Proceedings of the Eighth International Conference on Electrical Machines and Systems, vol. 1, Sep. 2005, 4 pages.
Non-final office action dated Aug. 17, 2012 regarding U.S. Appl. No. 13/431,539, 17 pages.
Final Office Action dated Jan. 16, 2013 regarding U.S. Appl. No. 13/431,539, 11 pages.
Notice of Allowance dated Nov. 16, 2012 regarding U.S. Appl. No. 12/139,564, 10 pages.
Galdi et al., "Multi-Objective Optimization for Fuel Economy and Emissions of HEV Using the Goal-Attainment Method," EVA 18, published 2001, 12 pages.
Ackerman, "Hybrid Vehicle Cruises for Battle," Signal Magazine, Apr. 2004, 4 pages, accessed Jan. 9, 2013 http://www.afcea.org/content/?q=node/91.
Renault, "Kangoo reinvents the electric car," Renault press release, Mar. 2003, 3 pages.
L3 Research, Enigma Hybrid Specifications, L3 Research, Inc., copyright 2003, 1 page, accessed Jan. 9, 2013 http://www.l3research.com/vehicles/enigma/specifications.htm.
Suppes, "Plug-in Hybrid with Fuel Cell Battery Charger," International Journal of Hydrogen Energy, vol. 30, Issue 2, Feb. 2005, pp. 113-121.
Powers, "PHEV," About, Inc., copyright 2005, New York Times Company, 1 pages, accessed Jan. 9, 2013 http://web.archive.org/web/20051231074047/http://hybridcars.about.com.
"Plug-In Hybrids," hybridcars.com, copyright 2005, 2 pages, accessed Jan. 9, 2013 http://web.archive.org/web/20050310125208/http://www.hybridcars.com.
"All About Plug-In Hybrids (PHEVs)," CalCars, California Car Initiative, Copyright 2012, 4 pages, accessed Jan. 9, 2013 http://www.calcars.org/vehicles.html.

* cited by examiner

SMART ELECTRIC VEHICLE INTERFACE FOR MANAGING POST-CHARGE INFORMATION EXCHANGE AND ANALYSIS

BACKGROUND OF THE INVENTION

1. Field of the Invention

The present invention is related generally to an improved data processing system, and in particular, to a method and apparatus for managing electric vehicle charging transactions. More particularly, the present invention is directed to a computer implemented method, apparatus, and computer usable program code for smart electric vehicle interface for managing post-charge information exchange and analysis.

2. Description of the Related Art

Electric vehicles (EV) can be divided into two categories: totally electric vehicles (TEV) and plug-in hybrid electric vehicles (PHEV). Plug-in hybrid electric vehicles utilize two or more power sources to drive the vehicle. With the increasing costs of fossil fuels and concern over reliance on non-renewable resources, electric vehicles are poised to become a critical component of transportation systems throughout the world. Gasoline powered vehicles utilize the explosive power of a mixture of gasoline and air to propel the vehicle. In contrast, electric vehicles rely in whole or in part on electric power to drive the vehicle.

Electric vehicles contain electric storage mechanisms, such as batteries, to store electricity until it is needed to power the electric vehicle. The electric storage mechanisms require periodic charging to replenish the electric charge for continued operation. The electricity used to charge the electric storage mechanisms may be provided by an on-vehicle power generation and charging mechanism, such as a fuel cell, gasoline powered combustion engine, solar powered generator, or other electric energy generation mechanism.

In totally electric vehicles and plug-in hybrid electric vehicles, charging of the electric vehicles can also be accomplished by plugging the electric vehicle into an off-vehicle charging station. The off-vehicle charging station provides an external source of electricity, such as an electric power grid. Totally electric vehicles require this type of off-vehicle charging in all cases. Off-vehicle charging is also likely to be significantly less expensive for plug-in hybrid electric vehicles than on-vehicle charging and may consequently be the preferred charging mode for electric vehicle owners.

The power stored in the electric storage mechanisms on the electric vehicles and on-vehicle power generation mechanisms may be used to provide electricity back to the electricity grid. For electric vehicles to be used as suppliers of electric power to an electric power grid, electric vehicles are connected to an off-vehicle infrastructure, which can efficiently consume the electricity generated or stored by the electric vehicle. To date, electric vehicle manufacturers and electric utility companies have only planned and provided infrastructure and methods for the most rudimentary charging scenario in which the electric vehicle is plugged into a common electric outlet.

BRIEF SUMMARY OF THE INVENTION

According to one embodiment, a computer implemented method, apparatus, and computer program product is provided for managing post-charge information distribution for an electric vehicle. In one embodiment, a user profile is updated with charging process data that is derived, in part, from a charging process between the electric vehicle and a charging station. The process then identifies a set of recipients of data from the user profile. The set of recipients include a set of third party principals. The data from the user profile is processed using a set of data processing rules specified by the set of recipients to form processed data. Thereafter, the processed data is transmitted to the set of recipients according to preferences of the set of recipients.

DETAILED DESCRIPTION OF THE INVENTION

Figure 1:
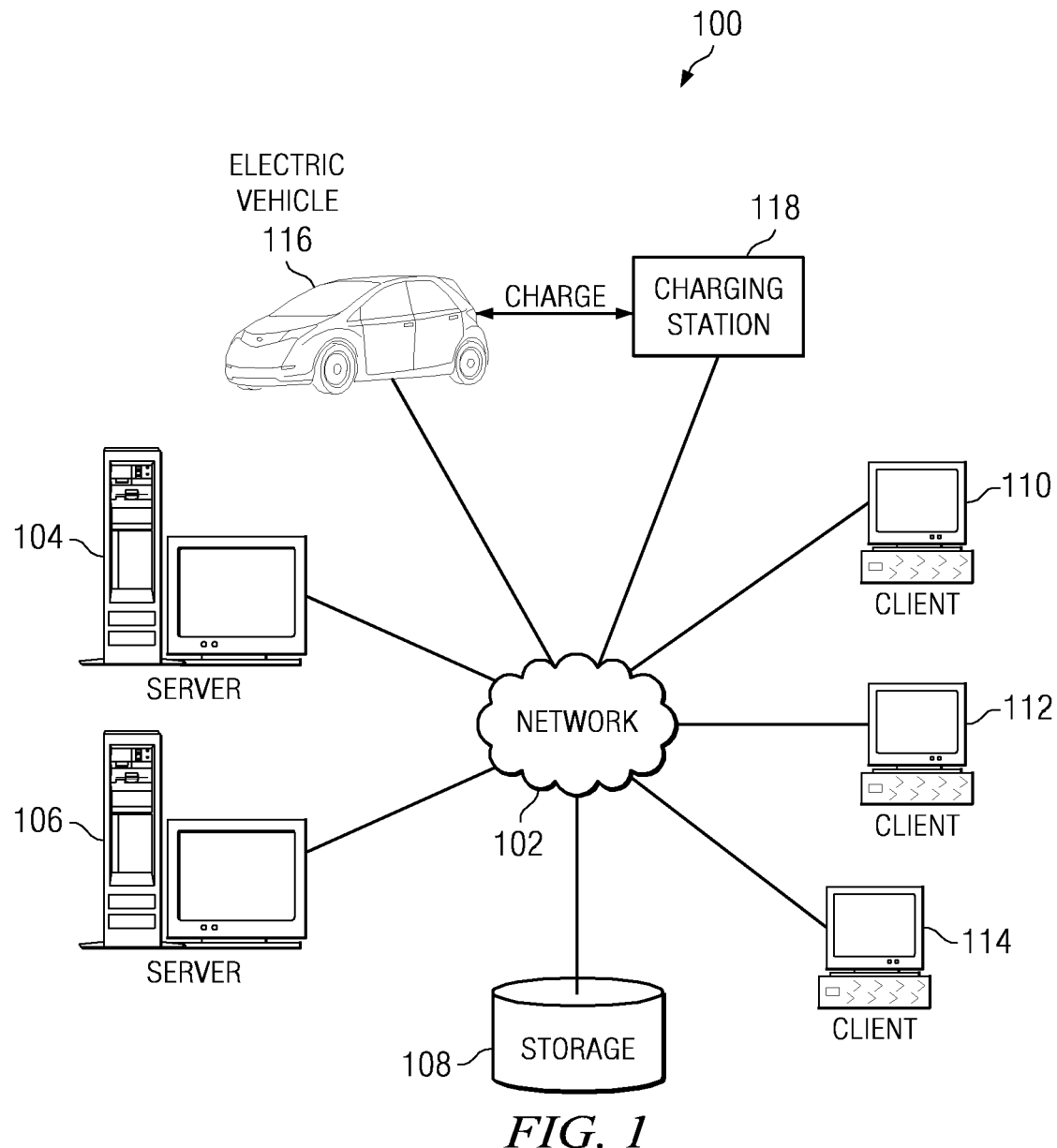
FIG. 1 is a block diagram of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
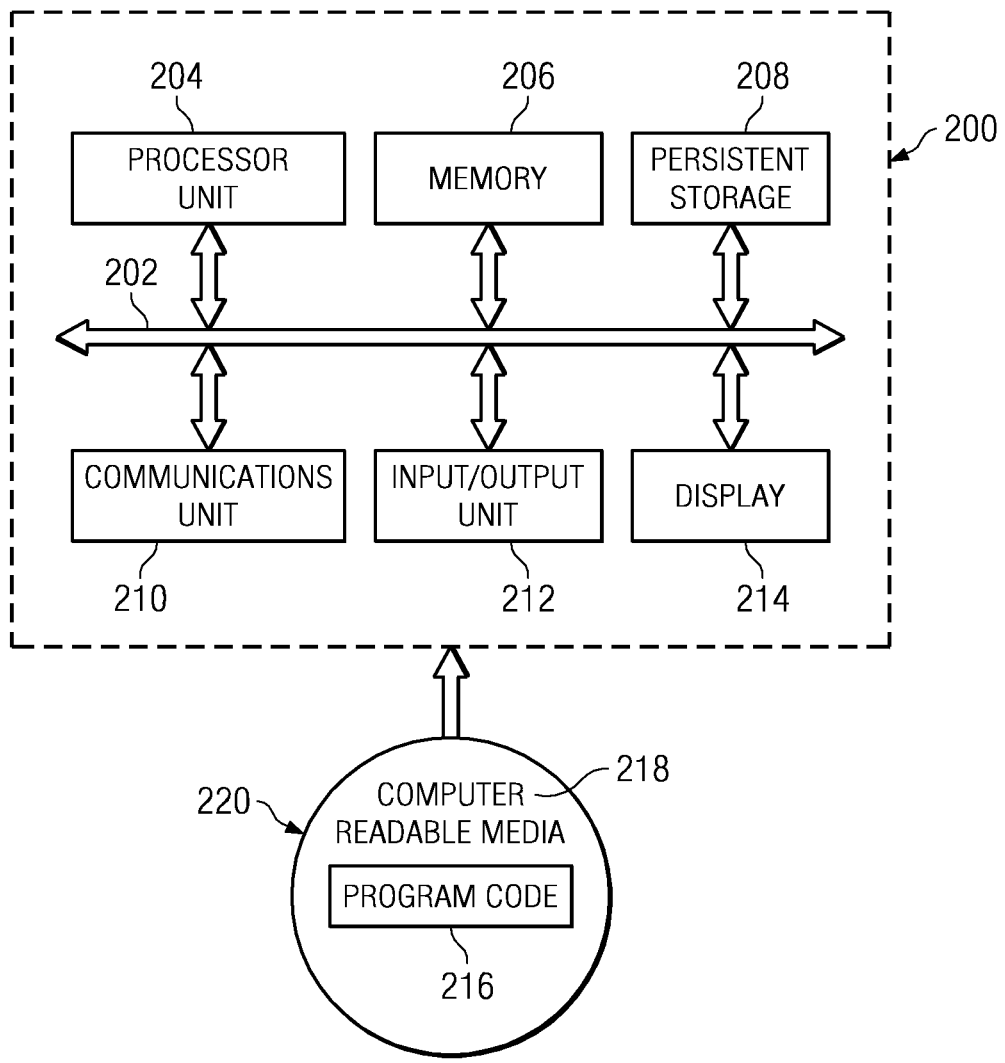
FIG. 2 is a block diagram of a data processing system in which illustrative embodiments may be implemented.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Electric vehicle 116 is any vehicle that utilizes electric power, in whole or in part, to drive the vehicle that is capable of being plugged into charging station 118. Electric vehicle 116 may be a totally electric vehicle or a plug-in hybrid electric vehicle. The plug-in electric hybrid vehicle may be a gasoline/electric hybrid, a natural gas/electric hybrid, a diesel/electric hybrid, a biodiesel/electric hybrid, or any other type of plug-in electric hybrid. Electric vehicle 116 may optionally include an on-vehicle power generation mechanism such as, but without limitation, solar power electric generators, gasoline powered electric generators, biodiesel powered electric generator, or any other type of on-vehicle electric power generation mechanism.

Charging station 118 is any station, kiosk, garage, power outlet, or other facility for providing electricity to electric vehicle 116. Electric vehicle 116 receives electricity from, or provides electricity to, an electric grid at charging station 118. Charging station 118 is a selected charge/discharge site, such as an outlet or kiosk, for providing electric vehicle 116 with access to the electric grid. For example, and without limitation, charging station 118 may be a power outlet in a privately owned garage, an electric outlet in a docking station in a commercially owned electric vehicle charging kiosk, or a power outlet in a commercially owned garage.

Electric vehicle 116 connects to charging station 118 via an electrical outlet or other electricity transfer mechanism. The electricity may also be optionally transferred via wireless energy transfer, also referred to as wireless power transfer, in which electrical energy is transferred to a load, such as electric vehicle 116, without interconnecting wires. The electricity may flow from charging station 118 into electric vehicle to charge electric vehicle 116. The electricity may also flow from electric vehicle 118 into charging station 118. The electricity transferred to charging station 118 may be sold back to the power grid. Alternatively, the electricity may be stored for local use. For example, electricity returned to charging station 118 may be used for powering electrical components of charging station 118, or for supplying power to other electricity powered devices within the premises of the charge station owner. Alternatively, the electricity may be stored and provided to another electric vehicle charging at a nearby charging station.

Electric vehicle 116 and charging station 118 are optionally connected to network 102. Electric vehicle 116 and charging station 118 send and receive data associated with the charging of electric vehicle, the capabilities of electric vehicle, the capabilities of charging station 118, the current charge stored in electric vehicle, the rate of charging electric vehicle, the price of electricity received from a power grid, identity of the owner and/or operator of electric vehicle 116 and/or any other data relevant to charging or de-charging electric vehicle 116 over network 102.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. Data processing system 200 may also be implemented as a computing device on-board an electric vehicle, such as electric vehicle 116 in FIG. 1.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Currently, electric vehicle manufacturers and electric utility companies have only planned and provided infrastructure for the most rudimentary charging scenarios, such as, merely plugging the electric vehicle into a common electric outlet that is owned by the owner and operator of the electric vehicle. The illustrative embodiments recognize that charging electric vehicles will frequently be conducted under much broader and more complex sets of circumstances than this simple scenario and infrastructure is needed to accommodate these complex transactions. For example, owners and operators of electric vehicles will frequently be required to charge their electric vehicle at a charging station that is remote from the home of the electric vehicle owner. In most circumstances, it is unlikely that the electric vehicle owner will own the off-vehicle charging stations from which the owner obtains electricity to recharge the electric vehicle. In such a situation, the owner or operator of the electric vehicle will likely be required to pay for the charge obtained from the off-vehicle charging station.

The illustrative embodiments recognize that the charging transactions by which electric vehicles obtain electricity from an off-vehicle charging station to charge the electric vehicle requires a much more complete, flexible, and interoperable system governing all aspects of the charging transaction. Electric vehicle charging transactions can be divided into the pre-charge phase, the charge phase, and the post-charge phase. During the pre-charge phase of decision enablement, all parties are presented with the conditions governing the charging transaction. Electricity flows to the electric vehicle and payment is made during the charge phase. Finally, during the post-charge phase of the transaction, an analysis is performed to provide incentives and induce specific behaviors on the part of any party involved in the transaction. Additional charging infrastructure may also be provided to meter electricity at the point of charge, identify the various parties involved in the transaction, and provide flexible business rules governing the flow of funds between those parties.

Figure 3:
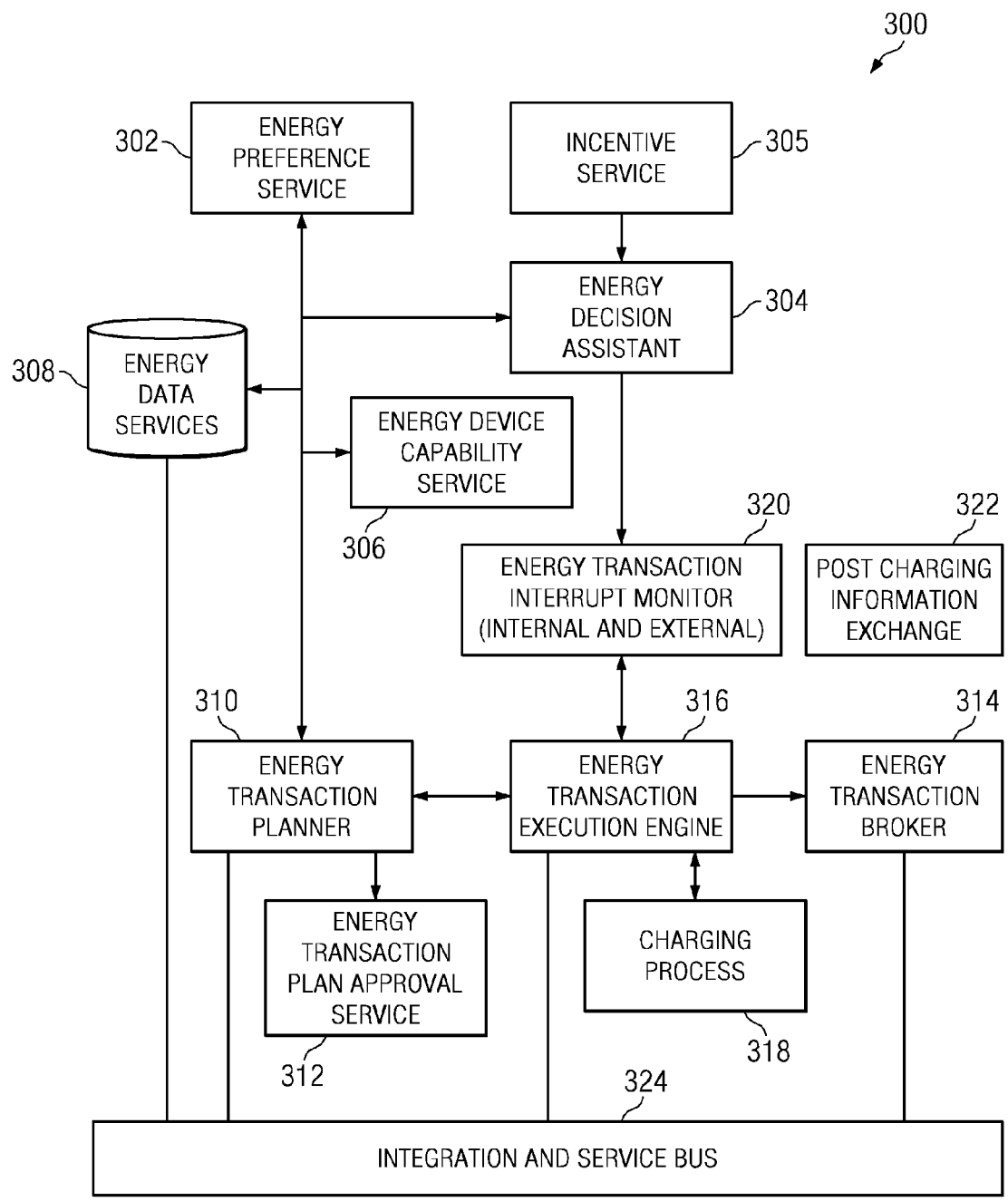
FIG. 3 is a block diagram of an energy transaction infrastructure in accordance with an illustrative embodiment.

FIG. 3 is a block diagram of an energy transaction infrastructure in accordance with an illustrative embodiment. Electric vehicle energy transaction infrastructure 300 is a charging infrastructure for managing all phases of an electric vehicle charging transaction. During the pre-charge phase, all parties of the transaction are presented with the conditions governing the charging transaction. The parties may include, without limitation, the owner of the electric vehicle to be charged, the operator of the electric vehicle, the owner of the charging station, and an electric utility company providing electricity to an electric power grid associated with the charging station. Parties agree to conditions relevant to their roll in the transaction prior to the charge commencing. There are likely to be many special circumstances in the terms and conditions, which are presented in standard formats which are universally understood and which can be readily communicated and agreed upon by all parties.

During the pre-charge phase, electric vehicle energy transaction infrastructure 300 utilizes energy preference service 302, energy decision assistant 304, energy device capability service 306, energy data services 308, energy transaction planner 310, and optionally, energy transaction plan approval service 312 to generate a plan governing the charging transaction to the parties involved in the transaction.

Energy preference service 302 is a software component that generates, stores, and retrieves preference information associated with an electric vehicle and the preference information associated with the parties to the transaction. Preferences may include, without limitation, a maximum price per kilowatt hour of electricity to be paid by a party, a location where charging may occur, a location where charging may not occur, a rate of charging the electric vehicle, a minimum amount of charge, or any other preferences associated with charging an electric vehicle. The preferences may be pre-generated by one or more of the parties to the transaction.

Energy decision assistant 304 optimizes the transaction based on available options and the preferences. If a conflict occurs between the preferences of different parties and/or the preferences of the electric vehicle, energy decision assistant 304 selects available options that resolve the conflicts, maximize the preferences of a particular party, or otherwise optimize the transaction based on one or more dimensions.

Incentive service 305 receives offers of incentives from third party vendors. The incentives may be offers of discounts, rebates, rewards, and/or other incentives associated with charging an electric vehicle to encourage an operator of the electric vehicle to perform one or more behaviors associated with charging the electric vehicle. For example, and without limitation, an incentive may offer to charge the electric vehicle for free at a particular charging station if the owner or operator of the electric vehicle purchases one or more products from the third party vendor. Incentives service 305 provides information describing current incentives to energy transaction planner 310. In one embodiment, incentives service 305 provides the information describing the incentives to energy decision assistant 304. Energy decision assistant 304 then provides the incentives information to energy transaction planner 310.

Energy device capability service 306 is a software component that identifies and validates device capabilities. For example, and without limitation, energy device capability service 306 may include information describing the charging capabilities of the charging station, the charging requirements of the electric vehicle, the maximum storage capacity of the electric vehicle on-vehicle storage mechanisms, the existing amount of charge in the electric vehicle, the number of amps of electricity the charging station is capable of providing, and any other information associated with the capabilities and requirements of the electric vehicles and the charging station.

Energy data services 308 are a set of one or more third party data sources providing information relevant to the energy transaction. Energy data services 308 may include, without limitation, weather information sources, traffic information sources, map and travel information sources, charging station price information sources, or any other third party information sources.

Energy transaction planner 310 is an application that creates a transaction plan based on preferences and utilizes energy decision assistant 304 to optimize the transaction based on variable inputs. Energy transaction plan approval service 312 approves the transaction plan and validates with energy transaction broker 314. Energy transaction plan 312 may be required to notify one or more parties of the terms of the transaction and obtain approval of one or more of the terms from the party. For example, and without limitation, if an operator of the electric vehicle is not the owner of the electric vehicle, energy transaction plan approval service 312 may require approval from the owner of the vehicle before allowing the vehicle to receive power at a charging station if the charging station and/or a utility will charge the owner of the electric vehicle a fee for the charging transaction.

In this example, the charging phase begins when energy transaction execution engine 316 sends the transaction plan generated by energy transaction planner 310 for approval by energy transaction plan approval service 312, initiates the request to begin charging the electric vehicle, monitors and logs the health and safety of charging process 318, and receives requests from energy transaction interrupt monitor 320. During charging process 318, electricity flows into the electric vehicle or out of the electric vehicle and back into the power grid. Energy transaction interrupt monitor 320 monitors data transmissions to detect interrupt conditions that may terminate the flow of electric power to or from a vehicle. The interrupts may originate from the power grid, suppliers, and/or vehicles. For example, if a price of energy exceeds a predefined threshold in violation of a user selected preference, energy transaction interrupt monitor 320 detects this interrupt condition and initiates appropriate actions to handle the cessation of electric power flow to the electric vehicle.

Energy transaction broker 314 supports settling an electric vehicle charging and discharge transaction independent of electricity supplier, parking space supplier, electrical infrastructure supplier, taxing authority, incentive provider, or other interested party. Elements include pricing schedules, time based pricing, facility recovery, tax collection, incentives, and/or fixed plans.

The post-charge phase comprises analysis of the completed energy transaction to provide incentives, redeem credits or benefits, and induce specific behaviors by one or more parties involved in the charging transaction. Various programs may be available to incent specific behaviors on the part of consumers. For example, a vehicle owner or user may receive reduced electricity rates if vehicle charging is conducted during off-peak times, such as during the night rather than during daylight hours when electricity usage is higher. Post charging information exchange 322 accumulates data pertinent to these incentives or redemption programs, authenticates the incentives data, and analyzes the incentives data to identify the most effective business process and optimize incentives for the parties.

During this charging phase, payment or fees for the charge are also made. Operational and financial parameters are conveyed for an optimum charge to occur. For example, a dynamic representation of an electric vehicle capability to consume charge should be understood at all times during the charging process to ensure the vehicle is not damaged or that the protections of the charging system are preserved. Electricity metering of the power flow may also be conducted and reported. Standards representing the acceptable charging voltage and amperage ranges, for example may be communicated and maintained for a safe charging transaction to occur. All data pertinent to the financial transaction is conveyed and recorded.

The components shown in FIG. 3 may be implemented on a data processing system associated with an electric vehicle. In such case, the components communicate and transfer data using integration and service bus 324. Integration and service bus 324 is an internal communication system within the electric vehicle, such as any wired or wireless communications system. A wired communications system includes, without limitation, a data bus or a universal serial bus (USB). If one or more components shown in FIG. 3 are located remotely, the components may transfer data using any type of wired or wireless network connection to connect to a network, such as network 102 in FIG. 1. A wireless network connection may be implemented over a cell phone network, satellite, two-way radio, WiFi networks, or any other type of wireless network.

The information generated during the charging process of an electric vehicle may be collected, analyzed, and distributed to third party entities. The third party entities may use this information to participate in the electric vehicle charging process settlement value chain. In particular, the third parties may offer other post-charge electric vehicle operation services and incentives. These services and incentives may be, directly or indirectly influenced by the data generated during electric vehicle charging process.

According to one embodiment, a computer implemented method, apparatus, and computer usable program code is provided for managing post-charge information distribution for an electric vehicle. In one embodiment, a user profile is updated with charging process data that is derived, in part, from a charging process between the electric vehicle and a charging station. The process then identifies a set of recipients of data from the user profile. As used herein, the phrase "set of" means one or more. Thus a set of recipients means one recipient, or two or more recipients. The set of recipients includes a set of third party principals. The data from the user profile is processed using a set of data processing rules specified by the set of recipients to form processed data. Thereafter, the processed data is transmitted to the set of recipients according to preferences of the set of recipients.

Figure 4:
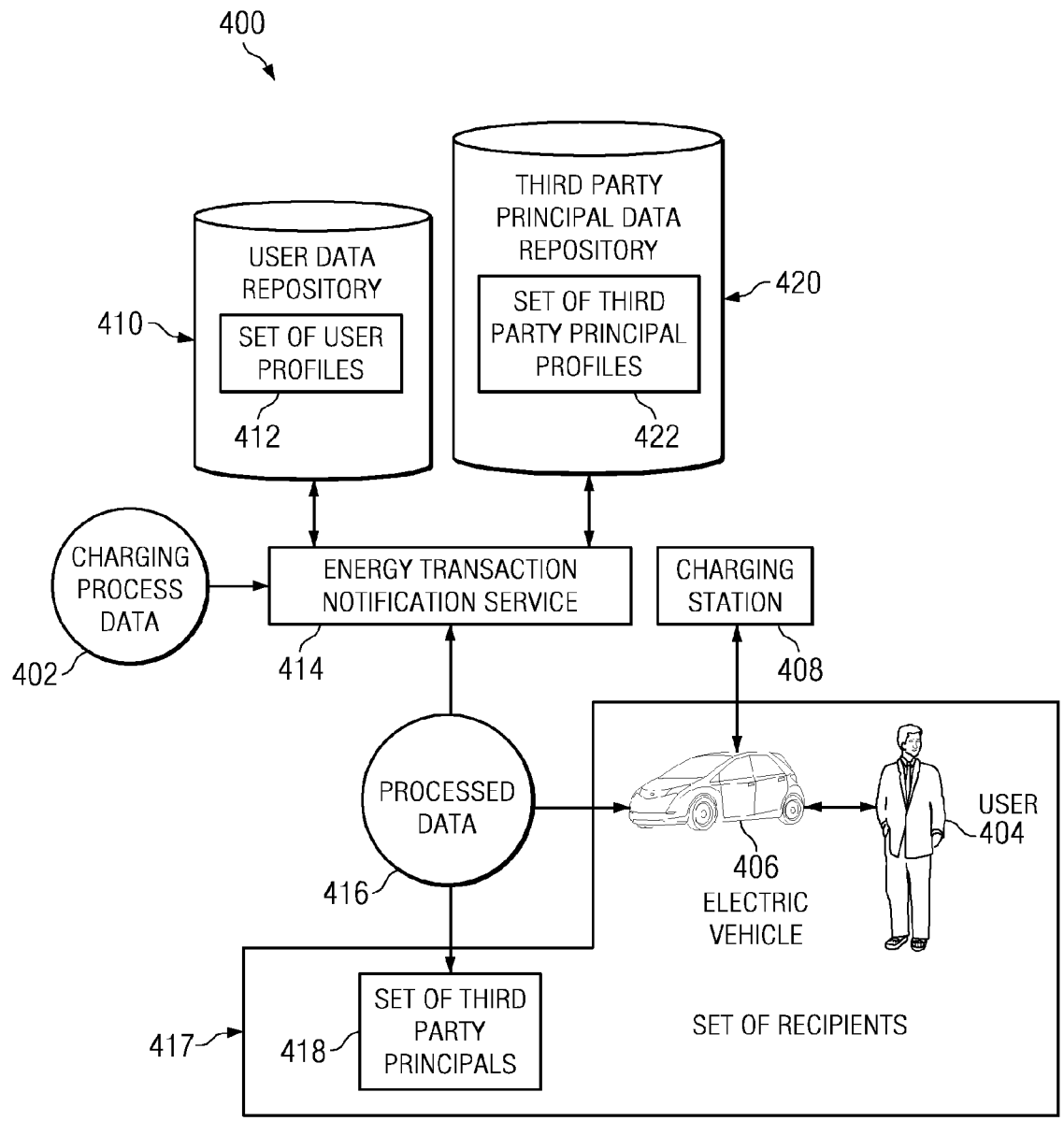
FIG. 4 is a block diagram of a data processing system for managing post-charge information processing in an electric vehicle charging infrastructure in accordance with an illustrative embodiment.

FIG. 4 is a block diagram of a data processing system for managing post-charge information processing in an electric vehicle charging infrastructure in accordance with an illustrative embodiment. Data processing system 400 is a network data processing system, such as network data processing system 100 in FIG. 1.

Data processing system 400 is configured for aggregating and processing charging process data 402. Charging process data 402 is specific to user 404. User 404 is an owner or operator of electric vehicle 406. Charging process data 402 is data collected during a charge period of electric vehicle 406 at charging station 408. Electric vehicle 406 is one or more electric vehicles, such as electric vehicle 116 in FIG. 1. Likewise, charging station 408 is a charging station such as charging station 118 in FIG. 1. Charging process data 402 may be received or retrieved from an energy transaction broker, such as energy transaction broker 314 in FIG. 3. However, in other embodiments, charging process data 402 may originate from another source, such as electric vehicle 406, charging station 408, energy transaction execution engine 316 in FIG. 3, or another component of energy transaction infrastructure 300 in FIG. 3.

Charging process data 402 may include at least one of travel data, vehicle data, user information, or charge data. As used herein the phrase "at least one of" when used with a list of items means that different combinations of one or more of the items may be used and only one of each item in the list may be needed. For example, "at least one of item A, item B, and item C" may include, for example, without limitation, item A or item A and item B. This example also may include item A, item B, and item C or item B and item C. Thus, charging process data may include either travel data, vehicle data, user information, charging information, or any combination thereof.

Travel data is information that relates to driving and operation of electric vehicle 406. Travel data may include, for example, identification of roadways on which electric vehicle 406 has traveled, distances traveled, charging locations visited, speeds attained, or other of information that may be derived from the movement of electric vehicle 406 from one location to another.

Vehicle data is information that relates to the status and maintenance of electric vehicle 406. For example, vehicle data may include battery capacity, tire pressure, engine efficiency, fuel efficiency for gas-electric hybrid vehicles, potential maintenance issues, or any other information relating to the condition of electric vehicle 406.

Charging information is information relating to the charging of electric vehicle 406. Charging information may include, for example, data related to the time and length of charge periods, amount of electricity received from or transmitted to a power grid, utility companies' sources from which the electricity originated, or any other information relating to the transmission of electricity between charging station 408 and electric vehicle 406.

Charging process data 402 may be stored in user data repository 410. User data repository 410 is a data storage device. For example, user data repository 410 may be a data server, hard drive, flash drive, or any other currently available or later developed storage device. User data repository 410 may also store set of user profiles 412. Set of user profiles 412 are one or more data files including information of one or more users. The information relates to the one or more users' ownership and/or operation of an electric vehicle, such as electric vehicle 406. Set of user profiles 412 may include, for example, user identification numbers, vehicle identification numbers, user preferences, and charging process data 402. The data stored in user data repository may be maintained in databases, tables, lists, arrays, or other forms of data structures configured for storing and organizing user profile data. Examples of information included in set of user profiles 412 are presented in user profile record 500 in FIG. 5, below.

Data stored in user data repository 410 may be aggregated and processed using energy transaction notification service 414. Energy transaction notification service 414 is a software application providing data aggregation and analysis services. In particular, energy transaction notification service 414 aggregates and analyzes charging process data 402. In addition, energy transaction notification service 414 may also process data originating from third party data sources, such as energy data services 308 in FIG. 3, for use in processing charging process data 402.

Energy transaction notification service 414 may include software code for processing charging process data 402. Alternatively, energy transaction notification service 414 may have access to third party software applications having code for processing data, such as charging process data 402.

Data stored in user data repository 410, which includes charging process data 402, may be processed to form processed data 416. Processed data 416 is data derived, at least in part, from charging process data 402. Processed data 416 may be sent to set of recipients 417. Set of recipients is one or more entities for receiving processed data 416. Set of recipients may include user 404, electric vehicle 406 or passengers within electric vehicle 406, and set of third party principals 418. Set of third party principals 418 is one or more entities involved in the charging process or the charging process settlement value chain. Set of third party principals 418 may have a financial or contractual interest for participating in the charging process settlement value chain. Set of third party principals 418 may include, for example, utility companies, energy data services providers, government agencies, or private or public corporations offering incentives or services to user 404 for influencing behavior. Incentives or services may include, for example, reduced tolls, reduced congestion zone charges, discounted parking, reduced insurance premiums, or other benefits that may induce specific behavior of user 404.

Set of third party principals 418 is associated with one or more profiles stored in third party principal data repository 420. Third party principal data repository 420 is a data storage device such as user data repository 410. Third party principal data repository 420 may store set of third party principal profiles 422. Set of third party principal profiles 422 are data files that include information specific to set of third party principals 418. For example, the information may include a unique identifier for identifying the third party principals, a list of incentives or services offered to users of electric vehicles, terms and conditions defining the scope of a third party principal's participation in the charging process settlement value chain, third party principal preferences, or any other relevant information.

The actual processing of user profile data to form processed data 416 depends upon data processing rules or other requirements specified by a particular recipient of processed data 416. In many instances, recipients of processed data 416 are a set of third party principals 418. Thus, the data processing rules may be provided in or identified by a profile assigned to a third party principal. For example, a third party participant may be a transit authority offering reduced toll rates or redeemable toll credits based upon a distance traveled by electric vehicle 406 using electric propulsion. Consequently, the transit authority may specify a data processing algorithm for determining a creditable distance based upon charging process data 402. Another third party participant may be an insurance company. The insurance company may specify a data processing algorithm requiring that processed data 416 identify instances where electric vehicle 406 exceeded a posted speed limit for calculating insurance premiums for an operator of electric vehicle 406. In addition, a government agency as a third party participant may specify yet another data processing algorithm requiring that processed data 416 includes a historic operation emission profile. The historic operation emission profile for electric vehicle 406 may be used for discounting vehicle registration fees or assessing fines for vehicles failing to comply with vehicle regulations. Thus, the generation of processed data 416 by energy transaction notification service 414 enables set of third party principals 418 to participate in the post-charge transaction settlement chain by providing set of third party principals 418 with properly formatted data.

Processed data 416 may be transmitted by energy transaction notification service 414 using any existing or later developed mechanism. For example, processed data 416 may be transmitted to set of third party principals using web services. Web services are automated information services that are conducted over the Internet, using standardized technologies and formats/protocols that simplify the exchange and integration of large amounts of data over the Internet. Processed data 416 may also be transmitted using asynchronous event notifications. An asynchronous event notification is a technique that allows an application, such as energy transaction notification server 414, to constantly monitor system events. In either event, transmission of processed data 416 may require that processed data 416 be encrypted and authenticated using any currently existing or later developed protocols.

Energy transaction notification service 414 may transmit processed data 416 to the owner or operator of electric vehicle 406. The transmission of processed data 416 for presentation to the owner or operator may be made on a smart phone communications device. Alternatively, processed data 416 may be transmitted to the owner or operator of electric vehicle 406 via a communications device integrated into electric vehicle 406. For example, processed data 416 may be presented to the operator of electric vehicle 406 on a display screen in the dashboard of electric vehicle 406.

In an illustrative embodiment, electric vehicle 406 is charging at charging station 408. During charging, electric vehicle 406 may be providing electricity to or receiving electricity from a power grid. As a result of the charging, charging process data 402 is generated from data stored in electric vehicle 406 or periodically uploaded from electric vehicle 406 from remote locations during operation. In addition, energy transaction notification service 414 may receive charging process data 402 from an energy transaction broker, such as energy transaction broker 314 in FIG. 3, during a charge period. Thereafter, energy transaction notification service 414 updates a user's profile stored in user data repository 410. The user's profile is updated with the information of charging process data 402.

Energy transaction notification service 414 identifies set of third party principals 418 involved in the charging process settlement chain. Set of third party principals 418 may be identified by associating a user profile from user data repository 410 with a set of third party profiles stored in third party principal data repository 420. For example, a user profile may include a set of pointers identifying one or more third party principals having a financial or contractual interest in the post-charge transaction settlement chain. In an alternate embodiment, energy transaction notification service 414 may identify set of third party principals 418 by requiring interested third party principals to register with energy transaction notification service 414.

Figure 5:
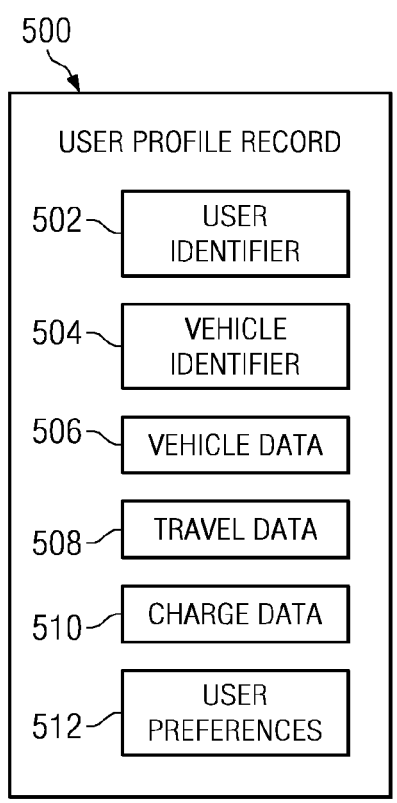
FIG. 5 is a block diagram of data of a user profile record in accordance with an illustrative embodiment.

FIG. 5 is a block diagram of data of a user profile record in accordance with an illustrative embodiment. User profile record 500 may be stored in a storage device such as user data repository 410 in FIG. 4.

User profile record 500 is a data file assigned to a user of an electric vehicle, such as user 404 and electric vehicle 406 in FIG. 4. User profile record 500 may include user identifier 502. User identifier 502 is a unique identifier assigned to a particular user for identifying the user participating in a charging process. In addition, user identifier 502 may also be used to identify the user in subsequent transactions by third party principals participating in the charging process settlement value chain. In addition, user profile record 500 may include vehicle identifier 504. Vehicle identifier 504 is a unique identifier for identifying a particular electric vehicle owned or operated by a user assigned to user profile record 500.

The information in user profile record 500 may be derived, in part, from charging process data, such as charging process data 402 in FIG. 4. For example, user profile record 500 may include vehicle data 506. Vehicle data 506 is a data type associated with the status or condition of an electric vehicle owned or operated by a user. For example, vehicle data 506 may include battery capacity, tire pressure, engine efficiency, fuel efficiency for gas-electric hybrid vehicles, potential maintenance issues, or any other information relating to the condition of an electric vehicle.

User profile record 500 may also include travel data 508. Travel data 508 is a data type associated with the driving and operation of an electric vehicle. Travel data 508 may include, for example, roadways on which the electric vehicle has traveled, distances traveled, charging locations visited, speeds attained, or other of information that may be derived from the movement of the electric vehicle from one location to another. In addition, travel data 508 may also include the identification of prospective roadways that will be traveled upon for a current trip. The prospective roadways may be identified from a vehicle Global Positioning Satellite navigation system.

In addition, user profile record 500 may also include charge data 510. Charge data 510 is a data type for information relating to the charging of an electric vehicle. Charge data 510 may include, for example, data related to the time and length of charge periods, amount of electricity received from or transmitted to a power grid, utility companies from which the electricity originated, or any other information relating to the transmission of electricity between a charging station and electric vehicle.

User profile record may also store user preferences 512. User preferences 512 is a data type for specifying preferences selected by a user for governing the user's participation in the charging process and the charging process settlement value chain. For example, user preferences 512 may specify preferred charging locations, identification of types of services or incentives in which the user is interested, preferred methods of receiving notifications of services or incentives, identification of utilities from which a charge may be received, or any other preference that may be associated with a charging process.

Figure 6:
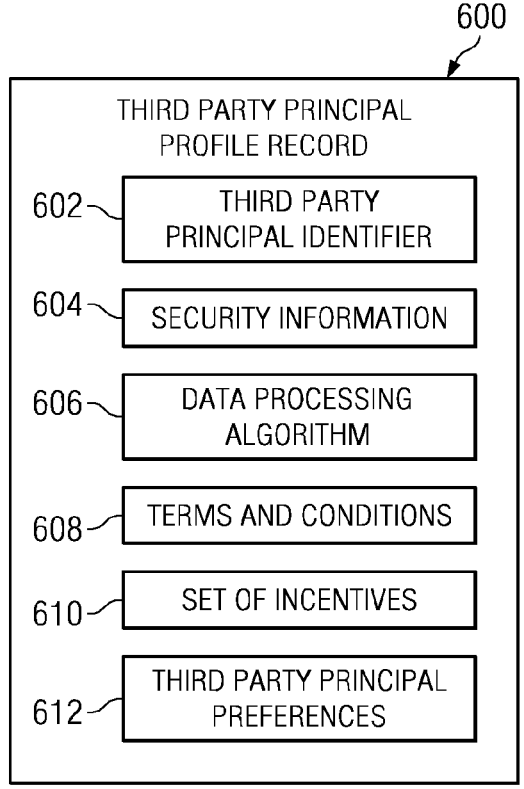
FIG. 6 is a block diagram of data of a third party profile record in accordance with an illustrative embodiment.

FIG. 6 is a block diagram of data of a third party profile record in accordance with an illustrative embodiment. Third party principal profile record 600 may be stored in a third party data repository such as third party principal data repository 420 in FIG. 4.

Third party principal profile record 600 includes third party principal identifier 602. Third party principal identifier 602 is a unique identifier assigned to the third party principal to which third party principal profile record 600 is assigned. Third party principal identifier 602 may be used to identify and differentiate the third party principals participating in the charging process settlement value chain.

Third party principal profile record 600 may also include security information 604. Security information 604 is a data type for protecting user data transmitted and received via a networked data processing system, such as data processing system 400 in FIG. 4. Security information 604 may include encryption and decryption algorithms for transmitting and receiving user data from an energy transaction notification service. In addition, security information 604 may include authentication algorithms for verifying the integrity of user data received. The encryption/decryption and authentication algorithms may be any currently available or later developed algorithm.

Third party principal profile record 600 also includes data processing algorithm 606. Data processing algorithm 606 is a data type that identifies the manner in which user data is to be collected or processed before transmission by an energy transaction notification service. For example, data processing algorithm 606 may identify categories of raw data that may be required by a third party principal for identifying incentives or services for offer to a user of an electric vehicle. The raw data may include, for example, an amount of electricity received from or provided to a power grid, a distance traveled using electric propulsion, a battery capacity, or other types of data that may be derived from the operation of an electric vehicle or from the charging process of the electric vehicle. In addition, data processing algorithm 606 may instruct an energy transaction notification service to analyze and/or process the user data in a particular manner before transmission to the third party principal. For example, a third party principal may require that user data be averaged over a particular time period before being transmitted. Alternatively, data processing algorithm 606 may provide or identify third party software for processing user data.

Third party principal profile record 600 may also include terms and conditions 608. Terms and conditions 608 is a data type for the rules governing the conduct of parties to the charging process settlement value chain. For example, terms and conditions 608 may allocate responsibilities and obligations, identify the parties to a charging process settlement value chain, or provide other guidelines.

Third party principal profile record 600 includes set of incentives 610. Set of incentives 610 are offerings provided to a user of an electric vehicle to encourage certain behavior. Set of incentives 610 may include, without limitation, rebates, credits, reduced costs, tax breaks, free items, or other forms of currency based incentives. In addition, set of incentives 610 may include preferential treatment, such as access of an electric vehicle to a selected location. The selected location may be, for example, a high occupancy vehicle (HOV) lane of a highway, a toll road, parking lots, or other locations accessible to the electric vehicle or owner of the electric vehicle.

Third party principal profile record 600 may also include third party principal preferences 612. Third party principal preferences 612 are preferences selected by third party principals. The preferences may govern the details of the participation of third party principals in a charging process settlement chain. For example, third party principal preferences 612 may identify preferred methods for receiving user data, methods for disbursing credits, benefits, or other incentives, criteria for selecting among available incentives for distribution to a user, criteria for participating or withdrawing from the charging process settlement value chain, or other preferences.

Figure 7:
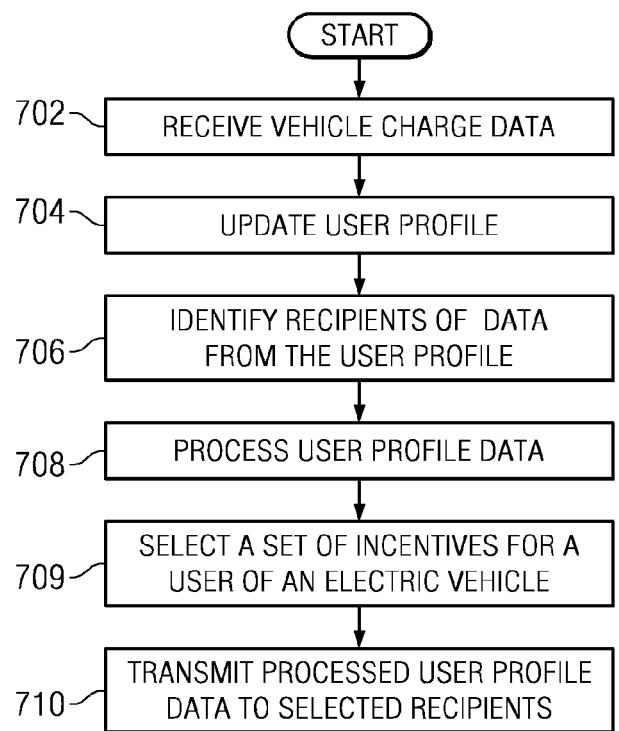
FIG. 7 is a flowchart of a process for managing post-charge information distribution for an electric vehicle in accordance with an illustrative embodiment.

FIG. 7 is a flowchart of a process for managing post-charge information distribution for an electric vehicle in accordance with an illustrative embodiment. The process may be implemented by software such as energy transaction notification service 414 in FIG. 4.

The process begins by receiving vehicle charge data (step 702). The vehicle charge data may be received from an energy transaction broker, such as energy transaction broker 314 in FIG. 3. The vehicle charge data may include, without limitation, travel data, vehicle data, and user information.

The process then updates a user profile associated with the vehicle charge data (step 704). Thereafter, the process identifies recipients of the user profile data (step 706). The recipients are third parties to the transaction that have a financial, contractual, or other type of interest in the outcome of the vehicle charge transaction.

The user profile data is then processed (step 708). Processing the data may involve locating data according to specified search criteria. In addition, processing the data may involve the application of data processing rules for modifying the data. The process then selects a set of incentives for a user of an electric vehicle (step 709). The set of incentives may be included in the processed data. Thereafter, the process transmits the processed data to selected recipients (step 710) and terminates thereafter.

According to one embodiment, a computer implemented method, apparatus, and computer usable program code is provided for managing post-charge information distribution for an electric vehicle. In one embodiment, a user profile is updated with charging process data that is derived, in part, from a charging process between the electric vehicle and a charging station. The process then identifies a set of recipients of data from the user profile. The set of recipients include a set of third party principals. The data from the user profile is processed using a set of data processing rules specified by the set of recipients to form processed data. Thereafter, the processed data is transmitted to the set of recipients according to preferences of the set of recipients.

The energy transaction notification service enables management of post-charge information distribution for an electric vehicle. The illustrative embodiments show how data derived from the operation of the electric vehicle is aggregated and processed after a charging period transaction has been completed. User data can be aggregated over time and processed. Alternatively, the user data may be processed as the user data is generated for immediate transmission to third party principals. Once processed, the user data may be transmitted to a set of third party principals for use in participating in the charging process settlement value chain. In this manner, the energy transaction notification service simplifies the settlement of charging processes and all other transactions, which may result therefrom.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts, or combinations of special purpose hardware and computer instructions.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principals of the invention, the practical application, and to enable others of ordinary skill in the art to understand the invention for various embodiments with various modifications as are suited to the particular use contemplated.

What is claimed is:

1. A computer implemented method of managing post-charge information distribution for an electric vehicle, the computer implemented method comprising:
    responsive to receiving charging process data, specific to a user of the electric vehicle updating a user profile associated with the user with the charging process data, wherein the charging process data is derived, in part, from a charging process between the electric vehicle and a charging station and wherein the user profile is maintained in a user data repository;
    identifying a set of recipients of data from the user profile, by associating the user profile from the user data repository with a set of third party profiles stored in a third party principal data repository wherein the set of recipients comprise a set of third party principals that offer incentives to users of electric vehicles;
    processing on a computer processor the data from the user profile using a set of data processing rules to form processed data, wherein the set of data processing rules are specified by the set of recipients;
    selecting a set of incentives for a user of the electric vehicle, wherein the set of incentives are offered by the set of third party principals from a respective set of third party principal profiles, the set of incentives including at least providing access to a selected location of a user using charging locations visited for receiving charging to an electric vehicle; and
    transmitting the processed data to the set of recipients according to preferences of the set of recipients.

2. The computer implemented method of claim 1, wherein identifying the set of recipients further comprises:
    identifying the set of recipients from a set of user preferences.

3. The computer implemented method of claim 1, wherein the set of incentives further comprises providing access to a user to a selected location, the location based on usage of charging facilities at the location.

4. The computer implemented method of claim 1, wherein the charging process data comprises at least one of travel data and vehicle data.

5. The computer implemented method of claim 1, wherein the set of incentives comprises a reduced payment.

6. The computer implemented method of claim 1, wherein the charging process data further comprises a data type of charge data for information relating to charging of the electric vehicle.

7. The computer implemented method of claim 1, wherein the processing on a computer processor the data from the user profile using a set of data processing rules to form processed data further comprises:
    selecting a data processing algorithm that identifies user data collected and processed before transmission by an energy transaction notification service.

8. The computer implemented method of claim 7, wherein the data processing algorithm selected identifies categories of raw data required by the third party principal for identifying incentives for offer to the user of the electric vehicle.

9. A computer program product for managing post-charge information distribution for an electric vehicle, the computer program product comprising:
    a non-transitory computer recordable-type medium;
    first program instructions for updating a user profile associated with a user with a charging process data specific to the user of the electric vehicle in response to receiving charging process data, wherein the charging process data is derived, in part, from a charging process between the electric vehicle and a charging station and wherein the user profile is maintained in a user data repository;
    second program instructions for identifying a set of recipients of data from the user profile, by associating the user profile from the user data repository with a set of third party profiles stored in a third party principal data repository wherein the set of recipients comprise a set of third party principals that offer incentives to users of electric vehicles;
    third program instructions for processing the data from the user profile using a set of data processing rules to form processed data, wherein the set of data processing rules are specified by the set of recipients;
    fourth program instructions for selecting a set of incentives for a user of the electric vehicle, wherein the set of incentives are offered by the set of third party principals, from a respective set of third party principal profiles the set of incentives including at least providing access to a selected location of a user using charging locations visited for receiving charging to an electric vehicle;
    fifth program instructions for transmitting the processed data to the set of recipients according to preferences of the set of recipients; and
    wherein the first program instructions, the second program instructions, and the third program instructions are stored on the non-transitory computer recordable-type medium.

10. The computer program product of claim 9, wherein the second program instructions further comprise:
    fifth instructions for identifying the set of recipients from a set of user preferences, wherein the fifth instructions are stored on the non-transitory computer recordable-type medium.

11. The computer program product of claim 9, further comprising:

sixth program instructions for selecting a set of incentives for a user of the electric vehicle, wherein the set of incentives are offered by the set of third party principals, and wherein the sixth instructions are stored on the non-transitory computer recordable-type medium.

12. The computer program product of claim 11, wherein the set of incentives comprises at least one of a reduced payment and access by the electric vehicle to a selected location.

13. The computer program product of claim 9, wherein the charging process data comprises at least one of travel data, vehicle data, and charge information.

14. The computer program product of claim 9, wherein the fourth program instructions comprise:
seventh program instructions for transmitting the processed data to the set of recipients using at least one of a web service, an asynchronous event notification, and a mobile communications device, and wherein the seventh instructions are stored on the non-transitory computer recordable-type medium.

15. An apparatus for managing post-charge information distribution for an electric vehicle, the apparatus comprising:
a bus system;
a memory connected to the bus system, wherein the memory includes computer usable program code; and
a processing unit connected to the bus system, wherein the processing unit executes the computer usable program code to:
update a user profile associated with a user with a charging process data specific to the user of the electric vehicle in response to receiving charging process data, wherein the charging process data is derived, in part, from a charging process between the electric vehicle and a charging station and wherein the user profile is maintained in a user data repository;
identify a set of recipients of data from the user profile, by associating the user profile from the user data repository with a set of third party profiles stored in a third party principal data repository wherein the set of recipients comprise a set of third party principals that offer incentives to users of electric vehicles; process the data from the user profile using a set of data processing rules to form processed data, wherein the set of data processing rules are specified by the set of recipients;
select a set of incentives for a user of the electric vehicle, wherein the set of incentives are offered by the set of third party principals, from a respective set of third party principal profiles the set of incentives including at least providing access to a selected location of a user using charging locations visited for receiving charging to an electric vehicle; and
transmit transmitting the processed data to the set of recipients according to preferences of the set of recipients.

16. The apparatus of claim 15, wherein the processing unit further executes the computer usable program code to identify the set of recipients from a set of user preferences.

17. The apparatus of claim 15, wherein the processing unit further executes the computer usable program code to select a set of incentives for a user of the electric vehicle, wherein the set of incentives are offered by the set of third party principals.

18. The apparatus of claim 17, wherein the set of incentives comprises at least one of a reduced payment and access by the electric vehicle to a selected location.

19. The apparatus of claim 15, wherein the charging process data comprises at least one of travel data, vehicle data, and charge data.

20. A system for managing post-charge information distribution for an electric vehicle, the system comprising:
a charging station, wherein the charging station exchanges electricity with the electric vehicle in a charging process and wherein the charging process generates charging process data;
an energy transaction execution engine, wherein the energy transaction execution engine controls an execution of the charging process; and
an energy transaction notification service, wherein the energy transaction notification service updates a user profile associated with a user with the charging process data specific to the user of the electric vehicle in response to receiving charging process data, wherein the charging process data is derived, in part, from the charging process between the electric vehicle and the charging station and wherein the user profile is maintained in a user data repository; identifies a set of recipients of data from the user profile, by associating the user profile from the user data repository with a set of third party profiles stored in a third party principal data repository wherein the set of recipients comprise a set of third party principals that offer incentives to users of electric vehicles; processes the data from the user profile using a set of data processing rules to form processed data, wherein the set of data processing rules are specified by the set of recipients; selects a set of incentives for a user of the electric vehicle, wherein the set of incentives are offered by the set of third party principals, from a respective set of third party principal profiles the set of incentives including at least providing access to a selected location of a user using charging locations visited for receiving charging to an electric vehicle; and transmits transmitting the processed data to the set of recipients according to preferences of the set of recipients.

* * * * *